United States Patent Office 3,700,426
Patented Oct. 24, 1972

3,700,426
HERBICIDAL CARBAMATE COMPOUNDS
John H. Cornell, Jr., Arlington, Mass., assignor to Monsanto Research Corporation, St. Louis, Mo.
No Drawing. Original application Apr. 21, 1966, Ser. No. 544,100. Divided and this application Oct. 1, 1968, Ser. No. 798,493
Int. Cl. A01n 9/20; C07c 101/00
U.S. Cl. 71—106                                4 Claims

ABSTRACT OF THE DISCLOSURE

A method for suppressing the growth of pigweed employing alkyl esters of N-alkoxy carbonyl alkylene-N-dialkoxymethylcarbamates as the phytotoxicants.

---

This is a division of application Ser. No. 544,100 filed April 21, 1966 now abandoned.

This invention relates to the reaction of the alkyl esters of isocyanatoalkanoic acids with the trialkyl esters of orthoformic acid and the products thereof.

It is an object of this invention to provide new and useful alkyl esters of N-alkoxycarbonylalkylene - N - dialkoxymethylcarbamates.

Still another object of this invention is to provide compounds useful as biological toxicants, such as pesticides and plant growth regulators.

These and other objects will become apparent as a detailed description of the invention proceeds.

According to the invention, there are prepared new and useful compounds which are the product of the reaction of an alkyl ester of isocyanatoalkanoic acid and a trialkyl ester of orthoformic acid, said reaction product having the formula:

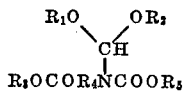

wherein each of $R_1$, $R_2$, $R_3$ and $R_5$ represent alkyl radicals free of aliphatic unsaturation of from 1 to 6 carbon atoms, and $R_4$ represents bivalent alkylene radicals free of aliphatic unsaturation consisting of from 1 to 4 carbon atoms.

The methods for preparing the compounds of this invention may vary. One convenient method is effected by contacting the alkyl ester of an isocyanatoalkanoic acid with a trialkyl ester of orthoformic acid in the presence of a catalyst, as illustrated by the equation:

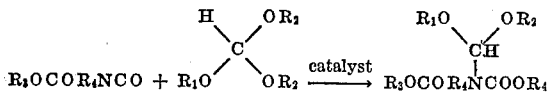

wherein each of $R_1$, $R_2$, $R_3$, $R_4$ and $R_5$ is as defined above.

There are shown below a number of the specific new compounds of the invention. It is not intended that this be a complete listing of all the compounds of the invention, but that it merely be illustrative thereof:

methyl N-dimethoxymethyl-N-methoxycarbonyl-
methylenecarbamate,
ethyl N-diethoxymethyl-N-ethoxycarbonylethylene-
carbamate,
propyl N-dipropoxy methyl-N-propoxycarbonyltri-
methylenecarbamate,
butyl N-dibutoxymethyl-N-butoxycarbonyltetra-
methylenecarbamate,
pentyl N-dipentoxymethyl-N-pentoxycarbonyl-
methylenecarbamate,
hexyl N-dihexoxymethyl-N-hexoxycarbonyltetra-
methylenecarbamate,
methyl N-dimethoxymethyl-N-ethoxycarbonyl-
methylenecarbamate,
ethyl N-dimethoxymethyl-N-butoxycarbonylethylene-
carbamate,
butyl N-dimethoxymethyl-N-propoxycarbonyltri-
methylenecarbamate,
hexyl N-dimethoxymethyl-N-methoxycarbonyl-
tetramethylenecarbamate,
ethyl N-diethoxymethyl-N-propoxycarbonylmethylene-
carbamate,
propyl N-diethoxymethyl-N-pentoxycarbonylethylene-
carbamate,
pentyl N-diethoxymethyl-N-hexoxycarbonyltetra-
methylenecarbamate,
methyl N-dipropoxymethyl-N-pentoxycarbonyl-
ethylenecarbamate,
propyl N-dipropoxymethyl-N-butoxycarbonyl-
trimethylenecarbamate,
pentyl N-dipropoxymethyl-N-methoxycarbonyltetra-
methylenecarbamate,
methyl N-dihexoxymethyl-N-pentoxycarbonyl-
methylenecarbamate,
butyl N-dibutoxymethyl-N-ethoxycarbonylethylene-
carbamate,
hexyl N-dibutoxymethyl-N-propoxycarbonyltetra-
methylenecarbamate,
ethyl N-dipentoxymethyl-N-methoxycarbonylethylene-
carbamate,
propyl N-dipentoxymethyl-N-ethoxycarbonyltri-
methylenecarbamate,
pentyl N-dipentoxymethyl-N-methoxycarbonyltetra-
methylenecarbamate,
methyl N-dihexoxymethyl-N-ethoxycarbonylmethylene-
carbamate,
butyl N-dihexoxymethyl-N-propoxycarbonylethylene-
carbamate,
pentyl N-dihexoxymethyl-N-methoxycarbonyltetra-
methylenecarbamate.

In preparing the compounds of this invention, isocyanatoalkanoic acid esters which may be used are, for example: methyl isocyanatoacetate, ethyl isocyanatoacetate, propyl isocyanatoacetate, butyl isocyanatoacetate, pentyl isocyanatoacetate, hexyl isocyanatoacetate, methyl isocyanatopropionate, ethyl isocyanatopropionate, propyl isocyanatopropionate, butyl isocyanatopropionate, pentyl isocyanatopropionate, hexyl isocyanatopropionate, isopropyl isocyanatopropionate, isobutyl isocyanatopropionate, sec-butyl isocyanatoacetate, tert-butyl isocyanatoacetate, methyl isocyanatobutyrate, ethyl isocyanatobutyrate, propyl isocyanatobutyrate, butyl isocyanatobutyrate, pentyl isocyanatobutyrate, isopentyl isocyanatobutyrate, methyl isocyanatovalerate, ethyl isocyanatovalerate, propyl isocyanatovalerate, butyl isocyanatovalerate, pentyl isocyanatovalerate, hexyl isocyanatovalerate, isopropyl isocyanatovalerate, isobutyl isocyanatovalerate, isopentyl isocyanatovalerate, and so forth.

Useful orthoformic acid esters are, for example: trimethyl orthoformate, triethyl orthoformate, tripropyl orthoformate, tributyl orthoformate, tripentyl orthoformate, trihexyl orthoformate, dimethylethyl orthoformate, dimethylhexyl orthoformate, diethylmethyl orthoformate, diethylpropyl orthoformate, diethylhexyl orthoformate, dipropylmethyl orthoformate, butyldipropyl orthoformate, dipropylhexyl orthoformate, dibutylmethyl orthoformate, dibutylpropyl orthoformate, dibutylhexyl orthoformate, dipentylmethyl orthoformate, butyldipentyl orthoformate, dipentylhexyl orthoformate, diisopropylmethyl orthoformate, diethylisobutyl orthoformate, and so forth.

In carrying out the process of this invention, the isocyanate compound is simply contacted with the orthoformic acid ester until reaction is complete. It is an advantage in moderating the reaction to add one of the reactants slowly and gradually to the other, though the reactants may optionally be added all at once.

Solvents are not required. The ratio of reactants may vary, molar ratios of the ortho acid ester to the isocyanate compound of at least 1:10 to about 10:1 may be used, but a 2:1 ratio is preferred. Excess reactant may be removed at the end of the reaction by extraction or distillation, for example.

Useful temperatures for conducting the preparation are, for example, the reflux temperature of the reaction mixture where solvents are employed, or any desired temperature from below 0° C. up to below the decomposition point of the ingredient of the reaction mixture. Atmospheric pressure is satisfactory for conducting the reaction, though sub- or super-atmospheric pressures may be used if desired, ranging from 0.05 millimeter of mercury to about 5,000 pounds per square inch.

Catalysts which may be used to accelerate the reaction are boron trihalides, such as boron trifluoride, boron triiodide, and boron trichloride, for example. Reaction time may vary. In general, it will depend on the nature of the reactants used and on the temperature of the reaction mixture. Ordinarily reaction time will vary from less than one minute to several hours.

The present new compounds are generally stable, well defined products soluble in acids, such as hydrochloric and hydrobromic acids, for example.

The new carbamates are useful for a variety of agricultural and industrial uses; for example, ethyl N-diethoxymethyl-N-ethoxycarbonylmethylenecarbamate may be used as a plant growth regulator, pesticide, or mammalian toxicant.

The invention will be further described with reference to the following specific examples. These examples are given for purposes of illustration only and are not to be taken as in any way restricting the invention.

EXAMPLE 1

This example illustrates the preparation of a compound in accordance with this invention.

In a reaction flask 43 grams (g.) (about 0.3 mole) of ethyl isocyanatoacetate is reacted with 100 g. (about 0.67 mole) of triethylorthoformate in the presence of 2.5 g. (about 0.02 mole) of boron trifluoride etherate. An exothermic reaction occurs causing the temperature of the reaction mixture to increase 2°–3° C. To insure complete reaction the reaction mixture is stirred for four hours at 50° C., causing the reaction mixture to turn dark red in color. After this period the reaction mixture is flash distilled at 87° C. at 60 millimeters of mercury (mm. Hg) pressure.

The resultant product is ethyl-N-ethoxymethyl-N-ethoxycarbonylmethylenecarbamate, a colorless liquid boiling at 101°–102.5° C. at 0.56–0.65 mm. Hg, $n_D^{25}$ 1.4296.

Elemental analysis confirms the assigned empirical formula $C_{12}H_{23}NO_6$:

|  | Percent calculated | Percent found |
| --- | --- | --- |
| Element: |  |  |
| C | 51.9 | 51.9 |
| H | 8.3 | 8.6 |
| N | 5.1 | 5.3 |

EXAMPLE 2

This example illustrates the use of a compound of this invention as a pesticide for the destruction of lower animal life forms.

In insecticidal screening, activity for control of the common housefly (*Musca domestica*) is demonstrated as follows. One microliter of an acetone solution containing ethyl-N-diethoxymethyl - N - ethoxycarbonylmethylene- carbamate at a concentration of 10 milligrams per milliliter (mg./ml.) is applied to the dorsum of the thorax of each test fly, the test being carried out on 48-hour-old female houseflies. The specimen flies are then held at 68° F. and in the range of from 50% to 60% relative humidity for 24 hours, prior to observation for mortality. A 20% kill is produced by the carbamate compound when tested in the above manner.

EXAMPLE 3

This example illustrates the use of a compound of this invention for the control of plant species.

Aluminum pan flats are filled with mixtures of two-thirds one-quarter mesh sieved soil, and one-third sand. Over one-third of the soil surface of each pan is scattered 20 seeds each of different kinds of grasses; seeds of broadleaf plants are scattered over the remaining surface. The seeds are then covered with soil to the pan top and the pan is sprayed with an aqueous dispersion of fertilizer and an insecticide. The surface of the boxes are next sprayed with 30 ml. of an acetone dispersion of ethyl-N-diethoxymethyl - N - ethoxycarbonylmethylenecarbamate, containing the product of Example 1 at a rate equal to 25 pounds per acre. The pans are then placed in water and allowed to absorb moisture until the soil surface is completely moist, after which they are held in a greenhouse under standard conditions of moisture and sunlight. After ten days, the number and species of plants which have germinated and grown are observed.

The carbamate compound is observed to produce a substantial suppression of plant germination and growth on pigweed.

EXAMPLE 4

This example illustrates the use of a compound of this invention as a mammalian toxicant.

A liquid containing 100 mg. of ethyl-N-diethoxymethyl-N-ethoxycarbonylmethylenecarbamate in 10 ml. of 0.1 N hydrochloric acid, is diluted with water to provide sample mixtures of varying concentrations which are injected into mice intravenously. At concentrations of 316 milligrams per kilogram (mg./kg.) (31.6 ml./kg.) 100 mg./kg. (10 ml./kg.), and 31.6 mg./kg. (3.16 ml./kg.) the specimen mice exhibited increased respiration and activity as well as hyperalgesia, mydriasis, and atoxia.

The compounds of this invention are generally applied for herbicidal and toxicant use in the form of sprays or aerosols. Useful sprays may be prepared by dispersing the present products in water with the aid of a wetting agent, to prepare aqueous dispersions which may be employed as sprays. For example, a liquid containing cyclohexanone and a polyalkylene glycol ether long chain alkyl benzene sulfonate emulsifier may be used to prepare such dispersion or emulsions. The products may also be applied as oil-in-water emulsion sprays. The present products may also be dissolved or dispersed in liquified gases such as fluorochloroethanes or methyl chloride and applied to plants or other pest organism hosts from aerosol bombs. Instead of employing liquids as carriers and diluents, herbicidal dusts which contain the present novel compounds as active ingredients may be prepared, for example, by incorporating the new products of this invention with a solid carrier such as talc, bentonite, fuller's earth, and so forth.

The amount of the active toxicant compound in the composition as applied will vary with the active ingredients, the manner of application, the species to be destroyed and the resistance of the plants to be sprayed, for example, and formulation and ratio of applications are suitably adjusted in accordance with these factors.

It is apparent that this invention may be extended to areas beyond those specifically described and that many widely differing embodiments can be made without departing from the spirit and scope thereof as defined herein. Therefore, it is not intended to be limited except as indicated by the appended claims.

What is claimed is:

1. A method for suppressing the growth of pigweed comprising applying to soil a herbicidal amount of a composition containing an active ingredient of the formula:

$$R_1OCHOR_2$$
$$R_3OCOR_4NCOOR_5$$

wherein each of $R_1$, $R_2$, $R_3$, and $R_5$ represent alkyl radicals free of aliphatic unsaturation of from 1 to 6 carbon atoms and $R_4$ represents bivalent alkylene radicals free of aliphatic unsaturation of from 1 to 4 carbon atoms.

2. The method of claim 1 in which said composition contains an inert carrier.

3. The method of claim 1 in which said composition contains an inert carrier and a dispersing agent.

4. The method of claim 1 wherein $R_1$, $R_2$ and $R_3$ are each ethyl and $R_4$ is methylene.

References Cited

UNITED STATES PATENTS 3,284,487  11/1966  Jon Brachel _____ 260—471

LEWIS GOTTS, Primary Examiner

C. L. MILLS, Assistant Examiner

U.S. Cl. X.R.

260—482 C